United States Patent [19]
Colston

[11] 3,904,042
[45] Sept. 9, 1975

[54] MANIPULATOR APPARATUS
[75] Inventor: John R. Colston, Annapolis, Md.
[73] Assignee: Westinghouse Electric Corporation, Pittsburgh, Pa.
[22] Filed: Feb. 25, 1974
[21] Appl. No.: 445,752

[52] U.S. Cl.................................. 214/1 CM; 3/1.2
[51] Int. Cl.²............................................ B25J 3/00
[58] Field of Search ...................... 214/1 CM; 3/1.2

[56] References Cited
UNITED STATES PATENTS
| | | | |
|---|---|---|---|
| 2,858,947 | 11/1958 | Chapman, Jr. .................. | 214/1 CM |
| 3,241,687 | 3/1966 | Orloff............................. | 214/1 CM |
| 3,414,136 | 12/1968 | Moore et al. .................... | 214/1 CM |

Primary Examiner—Frank E. Werner
Attorney, Agent, or Firm—D. F. Straitiff

[57] ABSTRACT

Manipulator apparatus having an arm with a particular arrangement of relatively-movable parts interconnected by power-operated pivot and rotary joints which afford capability for the arm to assume grossly-different configurations while effecting work functions via its one end, and a hand-operated controller for such arm, having a similar arrangement of parts and joints, but being biased and constrained to be stiff-jointed and have only one configuration, grossly. Torque sensors at the controller joints are arranged to control operation of actuators at the corresponding arm joints, respectively.

6 Claims, 5 Drawing Figures 3,904,042

MANIPULATOR APPARATUS

BACKGROUND OF THE INVENTION

1. Field of the Invention

Manipulator apparatus and controls therefor.

2. Description of the Prior Art

Mechanical arms, sometimes referred to as manipulators, are very often used when a particular environment is too hostile and/or difficult for a man's direct participation. The manipulator provides an extension of the human arm capability.

Heretofore, a variety of control systems have been devised for controlling operation of manipulator arms. One system, for example, employs a plurality of selectively-operable individual controls for the several rotary actuators affiliated with the joints of the arm. This enjoys the advantage of being relatively simple, but requires a high degree of skill and experience to operate in view of the number and complexity of the arm joints involved. Another system, referred to as the master-slave type, employs a hand controller that is a scaled replica of the arm being controlled and has the same degree of motion freedom as the parts and joints of the arm. This enjoys the advantage of affording ease of operation, but does require working space for accommodating movement of the controller parts, as well as care to avoid inadvertent misplacement of controller positioning which can result in an undesired corresponding manipulator arm positioning. Yet another system under current development employs a hand-operated controller that commands the manipulator arm according to direction and manner of force exertion on a control-input member. In this system, input force information experienced by the controller is translated by a coordinate transformation computer into suitable command signals for the arm joint actuators to enable relative directions of input command forces to result in corresponding relative movement directions of the manipulator arm. This system overcomes the limitations of the aforedescribed system, but tends to be somewhat complex and expensive.

SUMMARY OF THE INVENTION

The present invention, in providing a stiff-jointed hand-operated controller having parts and joints arranged similarly to those of the manipulator arm being controlled and torque-responsive means at the several joints controlling operation of respective actuators in the corresponding manipulator arm joints, affords a system which enjoys the advantages of the latter system set forth above, but without the need for coordinate transformation and the computer therefor.

The foregoing and other advantages and features of the invention will become apparent from the following detailed description of an illustrative embodiment of the invention when taken in connection with the accompanying drawings.

DETAILED DESCRIPTION OF PREFERRED EMBODIMENTS OF THE INVENTION

Figure 1:
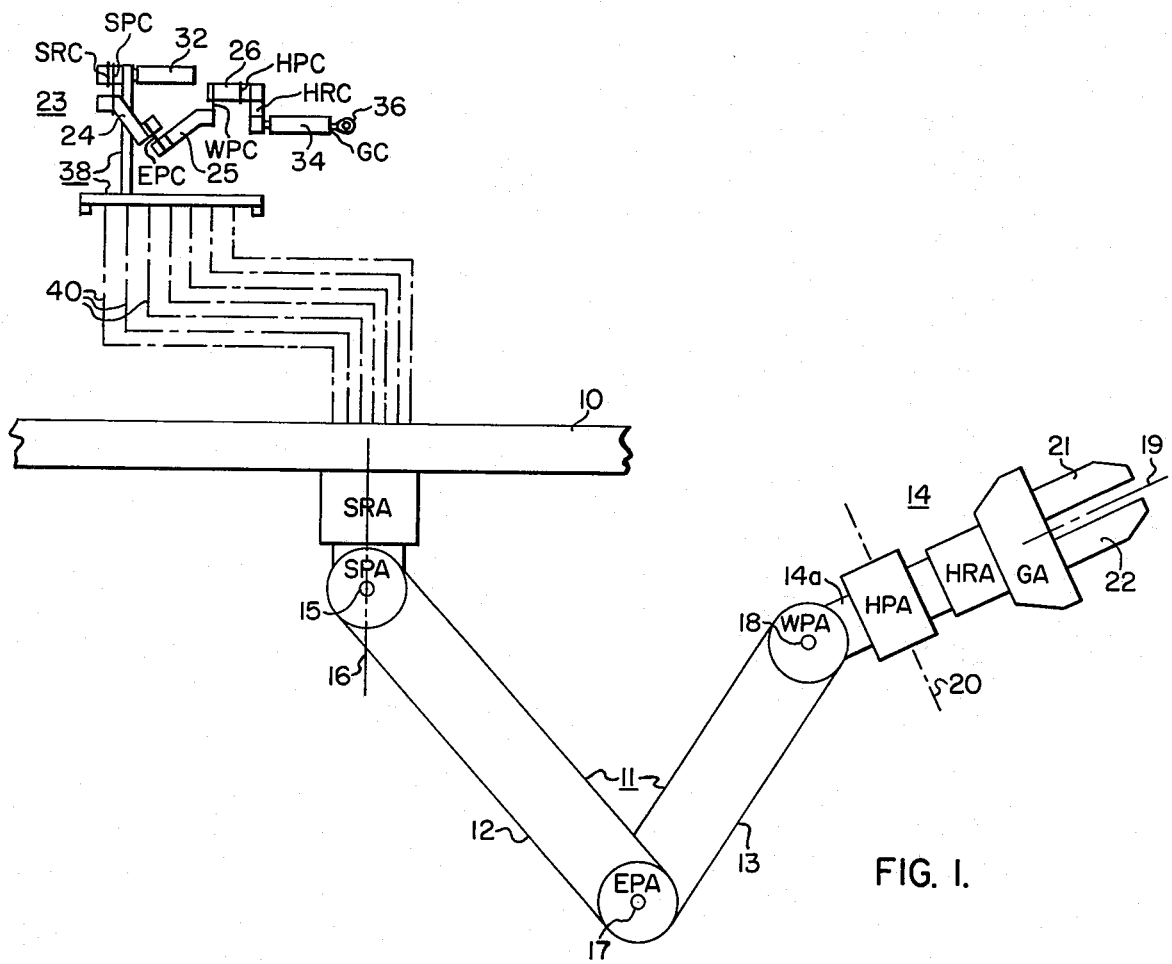
FIG. 1 is a schematic representation in outline and in elevation of a manipulator system embodying the invention.

Referring to FIG. 1, the manipulator arm apparatus of the present invention is affiliated with a mounting member 10, which, for example, may be the hull of an undersea vehicle, and such apparatus comprises, by way of illustrative embodiment, a manipulator arm 11 having an upper arm section 12, a lower arm section 13, and a terminal or hand section 14. The upper arm section 12 is supported by and connected to the mounting member 10 at a shoulder region that provides for pivotal movement of the upper end of such upper arm section about a horizontal axis 15 and for rotary movement about a vertical axis 16. The lower end of the upper arm section is pivotally connected to the one end of the lower arm section for turning movement about a horizontal axis 17. The other end of lower arm section 13 is connected to the hand section 14 for relative pivotal movement about a horizontal axis 18. The hand section 14 is turnable about an axis 19 which projects perpendicularly with respect to the axis 20. The hand section 14 also is bendable about an axis 20 that is perpendicular to the axis 18.

At the shoulder region of the upper arm 12, a rotary actuator SRA provides for turning such shoulder, hence the entire arm 11, about the vertical axis 16, and a rotary actuator SPA provides for pivotal movement of such shoulder region and arm 11 about the horizontal axis 15. At an elbow region joining the lower end of the upper arm to the one end of the lower arm section, a rotary actuator EPA provides for effecting relative pivotal movement of such ends about the axis 17. At a wrist region 14a of hand section 14 which joins the opposite end of the lower arm section to the mounted end of the hand section 14, an actuator WPA provides for relative pivotal or turning movement of such ends about the horizontal axis 18. Actuators HPA and HRA provide for pivotal and rotary movement of the hand section 14 about the axes 20 and 19, respectively. An actuator GA provides for effecting a grip action between two parallel fingers or jaws 21 and 22 of such hand section 14.

Figure 3:
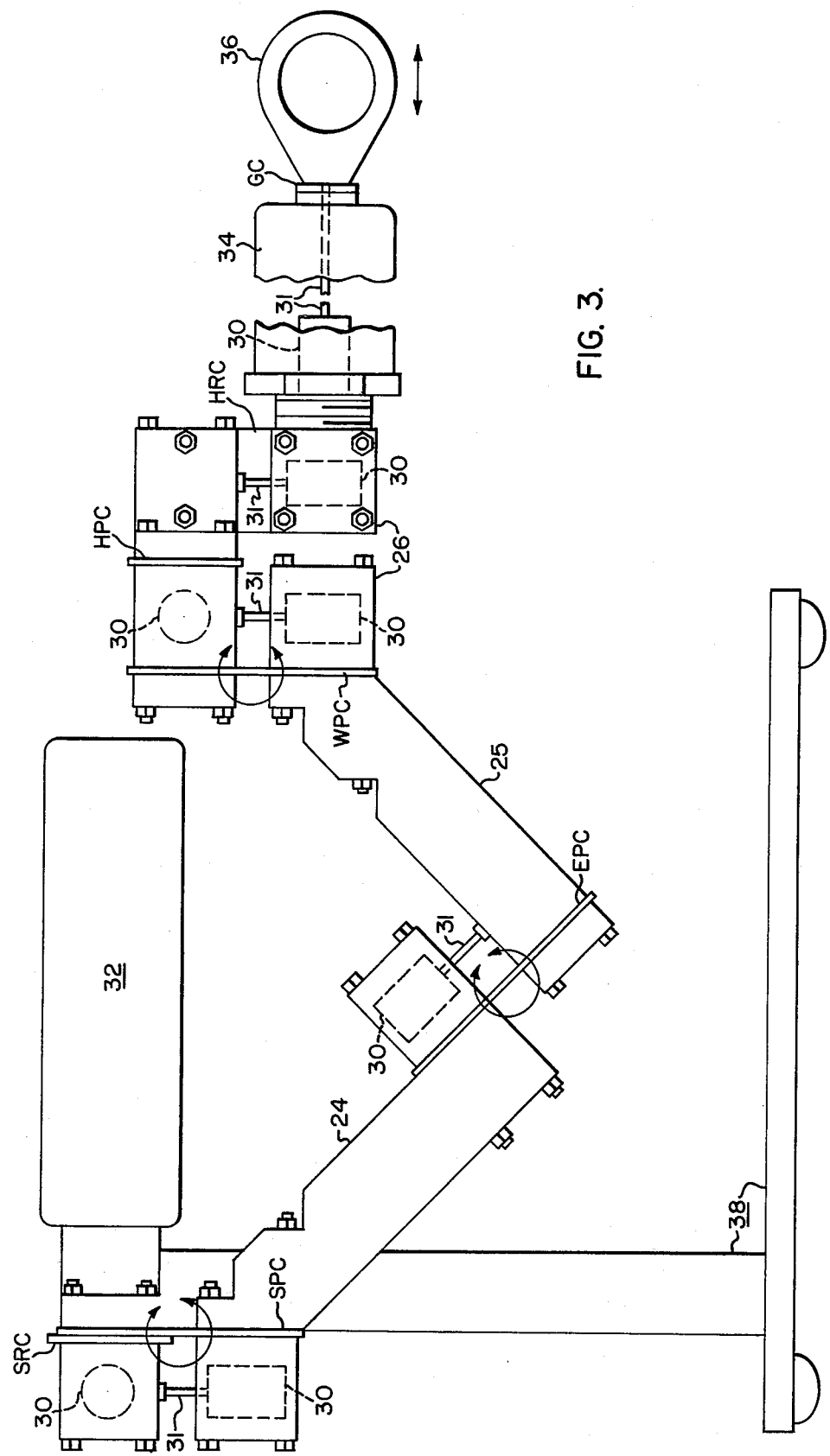
FIGS. 3 and 4 are side elevation and top views, respectively, which show, in outline, a hand controller construction found to be suitable for employment in the present invention.
Figure 4:
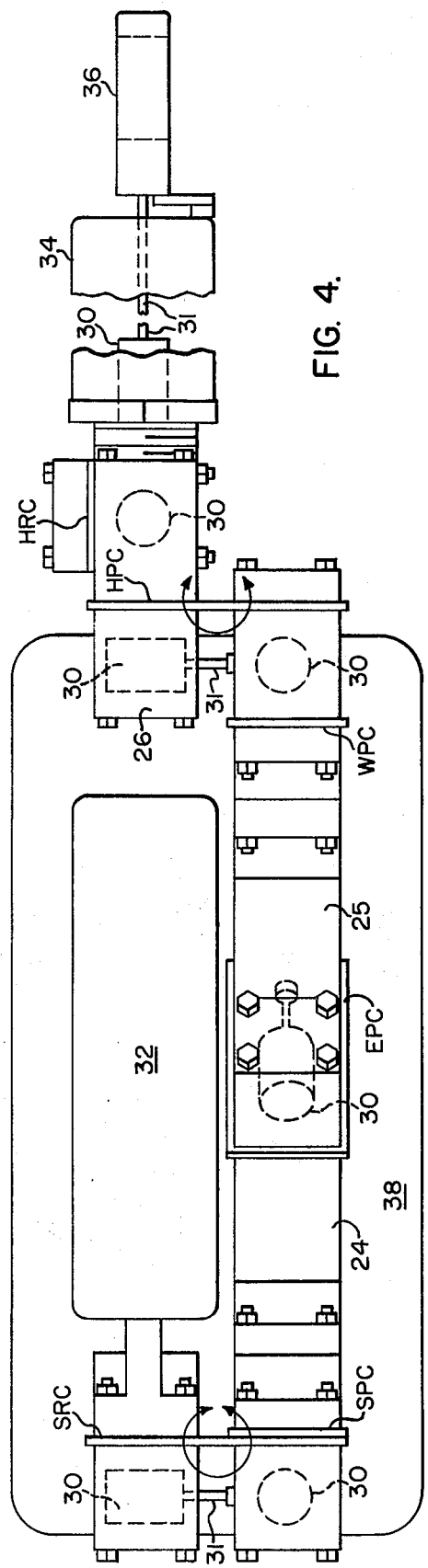

Referring to FIGS. 1, 3 and 4, in accord with a main feature of the present invention, a hand controller 23 is provided which includes upper arm, lower arm, and hand section parts 24, 25 and 26, respectively, arranged generally similarly to those corresponding arm parts 12, 13 and 14 of the manipulator arm. Controller parts 24, 25 and 26 are interconnected by stiff leaf springs SRC, SPC, EPC, WPC, HPC and HRC that act to maintain the controller 23 in one general configuration of relatively angulated parts while permitting limited angular movement at these leaf spring joints sufficient to obtain a torque-responsive output for controlling the rotary actuators SRA, SPA, EPA, WPA, HPA and HRA respectively in the manipulator arm 11, The limited flexure of the stiff leaf spring joints is measured by such as a number of variable resistors in the form of linear pots 30 actuated by stems 31; there being one pot 30 for each leaf spring.

A hand grip 32 or holding handle is provided the controller 23 for gripping and/or support by the left hand of a manipulator operator. Hand grip 32 corresponds to the mounting member 10 to which the manipulator arm 11 depends and is attached to one end of the shoulder rotate control leaf spring SRC. A second hand grip 34 for grasping the operator's right hand also is provided the controller 23. Hand grip 34 corresponds to the hand section 14 of the manipulator arm 11 and is attached to one end of the hand rotate control leaf spring HRC.

In operation, if the operator holds the controller hand grip 32 with his left hand and the controller hand grip 34 with his right hand, by exerting pushing, pulling, twisting and/or turning effort on the grip 34 relative to the grip 32, several or all of the leaf springs of the controller 23 can be made to flex slightly to control those actuators in the manipulator arm joints that correspond to the particular controller leaf springs undergoing such flexure. Regardless of the particular orientation of the controller 23 relative to the manipulator arm 11, the limited relative deflection movement between the two hand grips 32 and 34 results in a continuing corresponding relative movement between the hand section 14 of the arm 11 and the mounting member 10 as long as the manual deflection-producing effort between such grips is maintained. A finger-operated push-pull ring 36 is affiliated with the projecting end of the right hand grip 34 to operate a respective linear pot 30 for controlling the grip actuator GA in the hand section 14 of the manipulator arm 11. Upon relaxing any relative deflection-producing forces exerted between the hand grips 32 and 34 of the controller, movement of the arm 11 ceases and remains fixed until re-commanded by recreation of relative hand grip forces. The hand grip 32 is attached to a stand 38, which includes an upright and a base on which the controller can rest during non-use, or, if desired, also during use. Furthermore, if the base be made to become anchored without need for gripping the left hand grip of the controller, forces imparted to the right hand grip 34 relative to such base become effective to accomplish the same result as the two-hand mode of operation, to the advantage of allowing the left hand to be free for performing other tasks. In FIG. 1, the dot-and-dash lines 40 are intended to indicate operative respective control communications between the controller command joints and the actuators in the manipulator arm joints.

Figure 2:
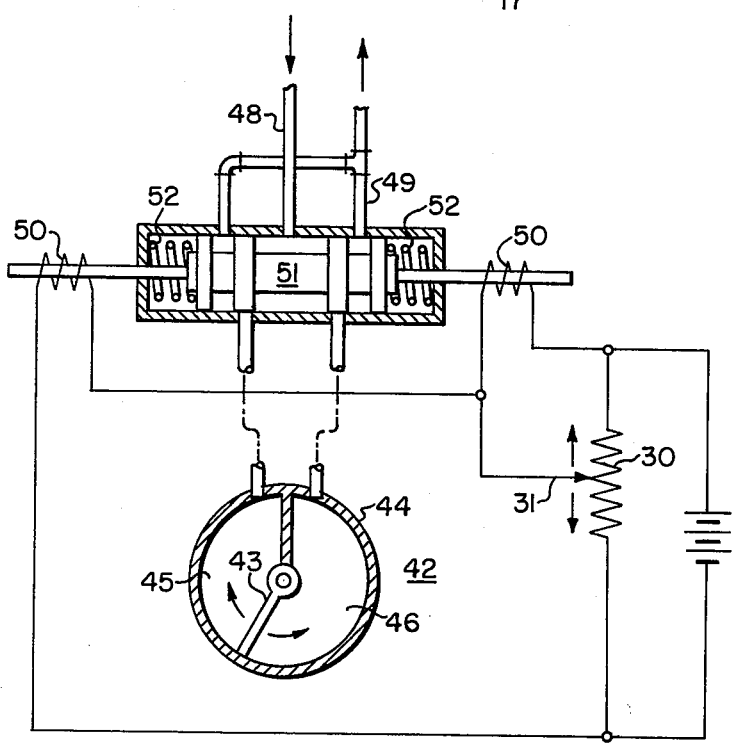
FIG. 2 is a schematic representation of an exemplification of an electro-hydraulically-controlled rotary actuator arrangement for employment in plurality in the manipulator system of the present invention.

Referring to FIG. 2, an arrangement suitable for controlling operation of a hydraulic rotary actuator 42 at a joint in the manipulator arm is illustrated schematically therein. The exemplified actuator 42 is in the form of a rotary vane type in behalf of simplification of description, but other types and operational modes also will suffice and may be preferred, without departing from the spirit and scope of the invention as defined by the appended claims. As shown, the vane 43 of actuator 42 will be connected to one side of a pivotal or rotary joint in the manipulator arm and the housing 44 will be connected to the other side of such joint. By supply of hydraulic fluid under pressure to one of the sides 45 or 46 of the vane 43 while the opposite side is relieved of hydraulic fluid, the vane can be made to turn in a selected direction at a rate commensurate with the rate of supply-release of such fluid. The torque which may be developed by such vane will depend upon the pressure difference established across it. By employment of a well-known flow-control servo valve device such as available commercially in torque-motor-controlled multi-stage form (not shown) the actuator 42 can be controlled according to operation of a respective linear pot 30 affiliated with a particular flex-spring joint in the controller. By way of exemplification, the pot 30 can be made to simultaneously control the degree of opening of one side of the vane 43 to a hydraulic pressure supply line 48 and the opposite vane side to a hydraulic return pressure line 49 by supplying of pot-varied control current to a pair of control windings 50 operatively coupled to a spool valve 51 biased by a pair of compression springs 52 toward a lap position in which fluid is retained at opposite vane sides, subject to relief which may be afforded for protection of the manipulator arm joint by such as connection of such vane sides to the return line 49 via spring-loaded check valves (not shown). Movement of the spool valve 51 in one direction or the other as well as the extent of such movement depends upon the adjustment of the pot 30 and this in turn determines the rate of flow of hydraulic fluid to and from the actuator 42 to cause vane turning at a commensurate rate. Upon restoration of the pot 30 to a neutral position, such as occurs each time the manual input effort to the hand controller is relaxed, the bias springs 52 will return to the spool valve 51 to its lap position in which it is shown in the drawing.

In the event that the manipulator arm is employed to shove on an object, for example, the force of such a shove will not be controlled by the controller 23 when the servo-valves for the actuators are of the flow-control type, such as exemplified schematically in FIG. 2. Where it is desired to control the rate of arm movement and the force which may be exerted by such arm on a body or object held or encountered by the arm, a pressure-control type of servo-valve device can be employed for the actuators, such as exemplified in simplified schematic form in FIG. 5 where the servo-valve of FIG. 2 is provided with feedback pressure pistons 55 acting on opposite ends of the spool valve 51 to cause it to assume its lap position responsively to establishment of a pressure differential across the actuator vane 43 that is commensurate with the particular degree of control current force established by the coils 50 acting on such spool valve.

Figure 5:
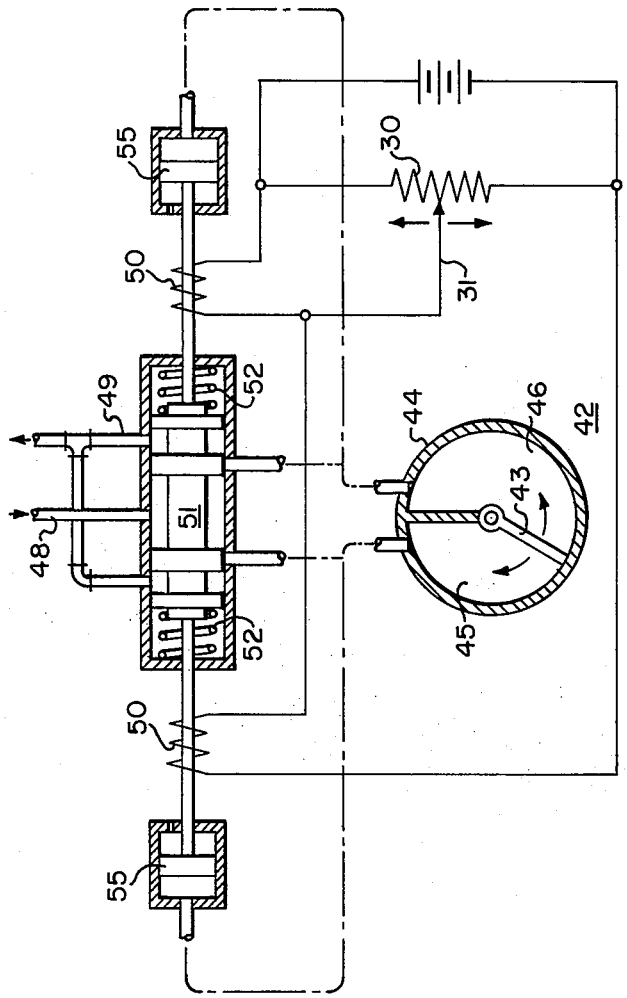
FIG. 5 is a schematic representation of an alternate arrangement for the exemplification of controlled rotary actuator shown in FIG. 2, to obtain control of actuator force absent in the FIG. 2 arrangement.

In the pressure-feedback type control, exemplified in simplified schematic form in FIG. 5, the arm joints will be caused to move at rates determined by rate of supply of hydraulic fluid to their actuators, up to the available limits determined by displacement of their spool valves 51 and their resistance to movement. So long as the control coils 50 maintain a control input force on the spool valve 51 in any given actuator circuit, corresponding to persistence of command force at the controller 23, such control input force determines the maximum differential which can be established across the actuator vane, hence controls the degree of maximum torque that can be established at a particular arm joint, and coupled with the other joints in the arm, such torque control in turn determines the maximum degree of force deliverable by the arm to an external body or object. Once the coil-generated control input force on the spool valve 51 is relaxed, coil 50 differential is nulled, such spool valve will respond to effect equalization of pressure across the vane 43. This can result in drift of the manipulator arm where the arm weight reaction on the vane 43 will affect the force balance on the pressure feedback pistons in a manner which tends to relieve such unbalance and allows the arm to droop. To prevent this drift, the operator can apply a force on the hand grip 34 in a direction opposite that of the arm weight or a force on the manipulator hand. This gives the operator an effective force feel which is an advantage in certain work tasks. When not desiring this drift during operator inattention, it may be desirable to arrange for bottling-up the fluid in the actuator 42 when the coil 50 control input to the servo-valve is nulled. This can be accomplished, for example, by suitable design of the pressure feedback valve, or by inclusion of auxiliary valves (not shown) controlled according to pot-30 output.

Whereas the present invention has been exemplified in connection with use of direct connection rotary hydraulic actuators for the manipulator arm joints, it is hereby pointed out that other types of actuators and/or connections can be equally suitable, and whereas control of actuator operation has been exemplified on the basis of a d.c. level control as determined by control current differential established at the servo valve, other types of control including a.c. control, pulse rate modulation, etc., may be equally suited. In case of pulse rate modulation control, servo valve operation is operated pulsedly in response to command pulses of different repetition rates determined by the operator controller, as well as the pulse width which can be adjusted at the pulse generator. Other variations and refinements (not shown) can also be incorporated in any given actuator control circuit, such as provision for adjustment of bias and gain, on-off control, etc. These and other variations will become obvious to those versed in the art from a reading of the foregoing description of the present invention.

I claim as my invention:

1. Manipulator apparatus comprising,
   a configuration-adjustable work arm having parts interconnected by joints permitting gross relative movment while maintaining the same relative movement relationships in all relative arm part positions,
   respective power actuators for such arm joints,
   a hand-operated single-configuration controller having parts corresponding to and arranged similar to the aforesaid work arm parts, with limited-movement joints biased toward neutral positions and interconnecting such parts to permit limited angular movement from such neutral positions in the same directions as those of the corresponding joints in said work arm, and
   control means including means responsive to the limited angular movement of the controller joints to effect operation of the aforesaid power actuators in the arm joints, respectively.

2. The manipulator apparatus of claim 1, wherein, the limited-movement neutral-position-biased joints of said controller are in form of leaf springs, and
   the joint-movement-responsive means coupled with said leaf springs constitute torque responsive means at the controller joints.

3. The manipulator apparatus of claim 1, wherein said apparatus comprises a mounting member, and
   said work arm parts include an upper arm portion, a lower arm portion, and a hand portion, and
   the joints of said work arm include a pair of shoulder joints connecting an end of said upper arm to said mounting member and affording rotary and pivotal movement of said end about normally vertical and horizontal axes, respectively, an elbow pivot joint between the other end of said upper arm and one end of said lower arm for pivotal movement about a normally horizontal axis, and a wrist pivot joint between the other end of said lower arm and said hand section for pivotal movement about a normally-horizontal axis.

4. The manipulator apparatus of claim 3, wherein said work arm includes a hand rotate joint for said hand portion.

5. The manipulator apparatus of claim 1, wherein said power actuators for the arm joints are hydraulically operated, and
   said control means includes electro-hydraulic servo valve means for controlling operation of such actuators.

6. The manipulator apparatus of claim 5, wherein said servo valve means is feedback responsive to hydraulic pressure delivered to said actuators.

* * * * *